United States Patent [19]

Bazarnik

[11] Patent Number: 4,612,623

[45] Date of Patent: Sep. 16, 1986

[54] TAMPER-RESISTANT, RUNNING TIME MAINTENANCE MONITOR WITH INDIVIDUALIZED MAINTENANCE MESSAGE AND METHOD

[75] Inventor: Louis M. Bazarnik, Jericho, N.Y.

[73] Assignee: Maintenance Technology, Inc., Long Island City, N.Y.

[21] Appl. No.: 637,300

[22] Filed: Aug. 3, 1984

[51] Int. Cl.$^4$ .............................................. G06F 15/20

[52] U.S. Cl. .................................... 364/569; 364/424; 377/20; 340/52 D

[58] Field of Search ........... 364/569, 551, 424, 431.01; 377/20; 340/52 D

[56] References Cited

U.S. PATENT DOCUMENTS

| | | | |
|---|---|---|---|
| 4,065,663 | 12/1977 | Edwards | 364/569 X |
| 4,142,238 | 2/1979 | Bradt et al. | 364/569 X |
| 4,168,525 | 9/1979 | Russell | 364/569 |
| 4,342,092 | 7/1982 | Kumagi | 364/569 |
| 4,355,365 | 10/1982 | McCracken et al. | 364/569 |
| 4,404,641 | 9/1983 | Bazarnik | 364/569 |
| 4,523,283 | 6/1985 | Muhlberger et al. | 364/431.01 |
| 4,533,900 | 8/1985 | Muhlberger et al. | 364/424 X |
| 4,539,632 | 9/1985 | Hansen et al. | 364/569 X |

OTHER PUBLICATIONS

Programmable Event Timer; G. J. Stephens, IBM Technical Disclosure Bulletin, vol. 22, No. 2, Jul. 1979, pp. 785–786.

*Primary Examiner*—Edward J. Wise
*Attorney, Agent, or Firm*—Kirschstein, Kirschstein, Ottinger & Israel

[57] ABSTRACT

A tamper-resistant, running time maintenance monitor for, and method of, indicating that equipment requiring periodic preventive maintenance is due for such maintenance. The monitor includes a keyboard for manually entering such user-selected data as an individualized access code, a warning time, a maintenance time, and at least some user-selected portion of a message individualized for the user. The entered data is stored and, if it is desired to change some or all of the data, e.g. the warning time, the maintenance time, or the individualized message portion, then the individualized access code must be entered. A running time sensor detects the running time, and a control unit accumulates the detected running time and generates warning and maintenance signals when the accumulated running time respectively matches the stored warning and maintenance times. A display displays an alpha-numeric warning message containing the individualized message portion when the warning signal is generated, and separately displays an alphabetic maintenance message when the maintenance signal is generated. The display also displays actual running time from an initially set starting running time, as well as a service time which indicates the time since the equipment was last maintained.

25 Claims, 3 Drawing Figures

TAMPER-RESISTANT, RUNNING TIME MAINTENANCE MONITOR WITH INDIVIDUALIZED MAINTENANCE MESSAGE AND METHOD

BACKGROUND OF THE INVENTION

1. Field of the Invention

This invention generally relates to a running time maintenance monitor for, and method of, indicating that equipment operatively connected to the monitor is due for maintenance and, more particularly, to a programmable maintenance monitor operative at user-selected warning and maintenance times to respectively display warning and maintenance messages, a portion of at least one of the messages being individualized to a particular user. Additionally, a user-selected access code protects unauthorized tampering with the warning and maintenance times and the individualized message portion.

2. Description of the Prior Art

A programmable running time maintenance monitor for indicating when equipment, such as a fork lift truck, an automotive vehicle or the like, requiring periodic preventive maintenance, is due for such maintenance, was disclosed in U.S. Pat. No. 4,404,641. This known monitor permitted a user to readily set a maintenance time indicative of when the equipment was due for maintenance and, when the maintenance time was reached, a readout alerted a user. Additionally, a pre-maintenance or warning time indicative of an advance indication of when the equipment was due for maintenance was set and, when the warning time was reached, a readout alerted the user. Although this known monitor generally was satisfactory for its intended purpose, experience has shown that some users tampered with the warning and maintenance time settings and, hence, delayed the scheduled maintenance, thereby shortening, in some cases, the working lifetime of the equipment.

Other running time maintenance monitors were disclosed, for example, in the following patents:

| | |
|---|---|
| U.S.L.P. No. | 3,948,039 |
| U.S.L.P. No. | 4,180,724 |
| U.S.L.P. No. | 4,389,709 |

Electronic timers employing electrolytic storage cells, wherein an electrical current was caused to flow through an electrolytic solution for designating an elapsed time after which equipment was ready for servicing, were disclosed, for example, in the following patents:

| | | | |
|---|---|---|---|
| U.S.L.P. No. | 3,355,731 | U.S.L.P. No. | 3,938,128 |
| U.S.L.P. No. | 3,546,693 | U.S.L.P. No. | 3,940,735 |
| U.S.L.P. No. | 3,603,880 | U.S.L.P. No. | 3,972,022 |
| U.S.L.P. No. | 3,903,736 | U.S.L.P. No. | 4,134,101 |

Other apparatuses, which record and display data, such as operating time and/or other data, and/or electronic timers, were disclosed, for example, in the following references:

| | | | |
|---|---|---|---|
| U.S.L.P. No. | 4,338,512 | U.S.L.P. No. | 4,072,850 |
| U.S.L.P. No. | 3,758,756 | U.S.L.P. No. | 4,142,238 |
| U.S.L.P. No. | 4,025,774 | U.S.L.P. No. | 4,168,525 |
| U.S.L.P. No. | 4,031,363 | U.S.L.P. No. | 4,218,871 |
| U.S.L.P. No. | 4,135,246 | U.S.L.P. No. | 4,271,402 |
| U.S.L.P. No. | 4,159,531 | U.S.L.P. No. | 4,296,409 |
| U.S.S.R. Patent No. | 542,192 | Japan Patent No. | 54-144840 |

Publication of Macon, Inc., entitled "Macon Central Lubrication Monitor", January 1980.

The use of a warning or disabling circuit was disclosed in U.S. Pat. No. 3,905,014.

The displays of the known maintenance monitors typically constituted audible or visible alarms or readouts to alert a user that maintenance was due. The conventional display merely lit up an indicator lamp and, in some cases, the lit lamp was located behind a light-transmissive panel on which a maintenance message was permanently affixed. Such permanent displays were the same for each user, and it would have been desirable to have had the user select, set and change, when desired, an individualized maintenance message appropriate for the particular user to thereby make compliance with the user's maintenance plan more effective.

Still further, it has been found for some equipment, such as electric fork lift trucks, which employ more than one motor, e.g. a drive motor for propelling the truck along the ground, a lift motor for lifting a load, and an auxiliary motor for tilting or projecting the lift carriage and/or for power steering, that the interval of time between deenergizing one motor and energizing another motor was lost in terms of accumulating the actual running time of the equipment.

It also has been found for running time maintenance monitors, particularly those which employ solid-state components, that a decrease in working lifetime of the solid-state components and/or data loss could occur when the running time was initiated by an equipment ignition switch which typically was cycled through an off-on-off-on cycle each time the equipment was started.

SUMMARY OF THE INVENTION

1. Objects of the Invention

It is a general object of the present invention to overcome the aforementioned drawbacks of prior art running time maintenance monitors.

It is another object of the present invention to prevent unauthorized tampering with the warning time, the maintenance time, or the individualized maintenance message.

It is yet another object of the present invention to increase the working lifetime of equipment to be maintained by enabling better compliance with a periodic preventive maintenance plan.

It is still another object of the present invention to enable an unauthorized user to select, set and change, when desired, the warning time and/or the maintenance time and/or the individualized maintenance message.

It is an additional object of the present invention to enable an authorized user to select and set an individualized access code and a starting running time from which the warning and maintenance times start.

It is a further object of the present invention to provide alphabetic or alpha-numeric maintenance messages.

It is still a further object of the present invention to delay the operation of the accumulation of the running time for a brief time interval after power to the equipment has been turned on.

It is yet a further object of the present invention to continue the operation of the accumulation of the running time for a brief time interval after power to the equipment has been interrupted.

An additional object of the present invention is to reduce the high cost of maintenance administration service plans, to decrease equipment downtime, to provide an accurate and reliable measure of running time, to reduce maintenance costs, and to increase the effectiveness of maintenance programs, particularly for fleets of equipment, such as industrial trucks, trains, buses, automobiles, taxis, aircraft, aircraft ground support equipment, machinery, construction equipment, farm equipment, etc.

Another object of the present invention is to provide a novel method of indicating that equipment is due for maintenance.

Still another object of the present invention is to enable a novel tamper-resistant, running time maintenance monitor to be individualized and customized for the use of a particular user.

Yet another object of the present invention is to provide a novel maintenance monitor which is accurate and reliable in operation, inexpensive to manufacture, and durable in use.

2. Features of the Invention

In keeping with these objects and others which will become apparent hereinafter, one feature of this invention resides, briefly stated, in a tamper-resistant, running time maintenance monitor for, and method of, indicating that equipment, e.g. any piece of equipment requiring periodic preventive maintenance, operatively connected to the monitor, is due for maintenance. The monitor comprises data entry means, e.g. a keyboard, for manually entering an individualized access code selected by a user. By separate manual entry, a warning time indicative of an advance indication of when the equipment is due for maintenance may be selected by the user and entered. A maintenance time is likewise selected and manually entered. An individualized numerical portion of a message, e.g. the phone number of the service department intended to perform the maintenance operation, likewise may be selected and manually entered for subsequent display, preferably as part of an alphanumeric warning message.

The monitor also comprises data storage means, e.g. a solid-state memory, for storing the individualized access code, the warning time, the maintenance time, and the individualized numerical message portion. Other non-manually entered data may be stored in the memory. For example, alphabetical characters which constitute the remainder of the warning message, and additional alphabetical characters which constitute an entire alphabetical maintenance message may be stored for subsequent display.

A running time sensor means operatively connected to an actuator, e.g. an ignition switch of the equipment being maintained, is employed for detecting the running time of the equipment each time the latter is operated. The monitor further comprises a control means operatively connected to the running time sensor means, and including accumulator means, e.g. a time counter, for accumulating each detected running time, and means for generating a warning signal and a maintenance signal when the accumulated running time respectively matches the stored warning time and the stored maintenance time. The control means may store a portion of the memory, e.g. the aforementioned alphabetical characters.

The monitor yet further comprises a display means operatively connected to the control means, for displaying the individualized alpha-numeric warning message and the alphabetic maintenance message upon generation of the warning and maintenance signals. In a preferred embodiment, the display means includes a multi-element display, each element having line segments generally arranged in a configuration resembling the numeral "8" and selectively energizable by the control means to form alphabetical and/or numerical characters.

Advantageously, the control means also is operatively connected to the data entry means and to data storage means, and includes verification means for verifying that a code subsequently manually entered via the data entry means matches the stored access code, and enabling means for separately enabling the stored warning time and the stored maintenance time to be respectively changed when the subsequently entered access code matches the stored access code. This feature resists tampering with the stored warning time and the stored maintenance time, and prevents changing either or both of these times unless the access code is known.

Other anti-tampering features reside in preventing the changing of the stored individualized numerical portion of the warning message. In addition, a service time indicative of when the equipment last was maintained may be entered via the data entry means, and stored via the data storage means, and changed, as desired, via the control means but only if the access code is known to prevent tampering with the service time.

The control means also generates first and second control signals when the warning and maintenance signals are respectively generated. The monitor also comprises switching means, preferably constituting two relays, each having a pair of normally-open and normally-closed switches, for opening and/or closing an electrical circuit operatively connected to the equipment upon the generation of the first and second control signals. Such opened and/or closed switches can be employed, for example, in performing a function, such as disabling the equipment to prevent its operation beyond its scheduled maintenance time.

The individualized alpha-numeric and/or alphabetical messages appearing on the display represent a significant improvement over prior art maintenance monitors wherein indicator lamps were merely lit up or, in some cases, wherein the lamps lit up behind a light-transmissive panel having a permanently affixed message. The individualized message, which is customized for each user, makes compliance with the user's maintenance program more effective, particularly when the individualized message contains the phone number of the service department assigned to maintain the equipment.

In accordance with another feature of this invention, when power to the equipment is briefly interrupted, e.g. when the aforementioned ignition switch is cycled through an off-on-off-on cycle during start-up of the equipment, or e.g. due to battery fluctuations or failure, or e.g. when the equipment has many power sources and one is deenergized prior to energization of another, a power-off run means is provided to maintain the accumulator means operational and to keep a more accurate record of the running time and, hence, the wear-and-tear of the equipment.

Still another feature of this invention is embodied in delaying the operation of the accumulator means for a brief time interval at the beginning of each power energization. This feature, although somewhat sacrificing the overall running time accuracy, serves to increase the working lifetime of the solid-state components of the monitor and helps insure against stored data loss.

The novel features which are considered as characteristic of the invention are set forth in particular in the appended claims. The device itself, however, both as to its construction and its mode of operation, together with additional features and advantages thereof, will best be understood upon perusal of the following detailed description of certain specific embodiments with reference to the accompanying drawings.

DETAILED DESCRIPTION OF THE PREFERRED EMBODIMENTS

Figure 1A:
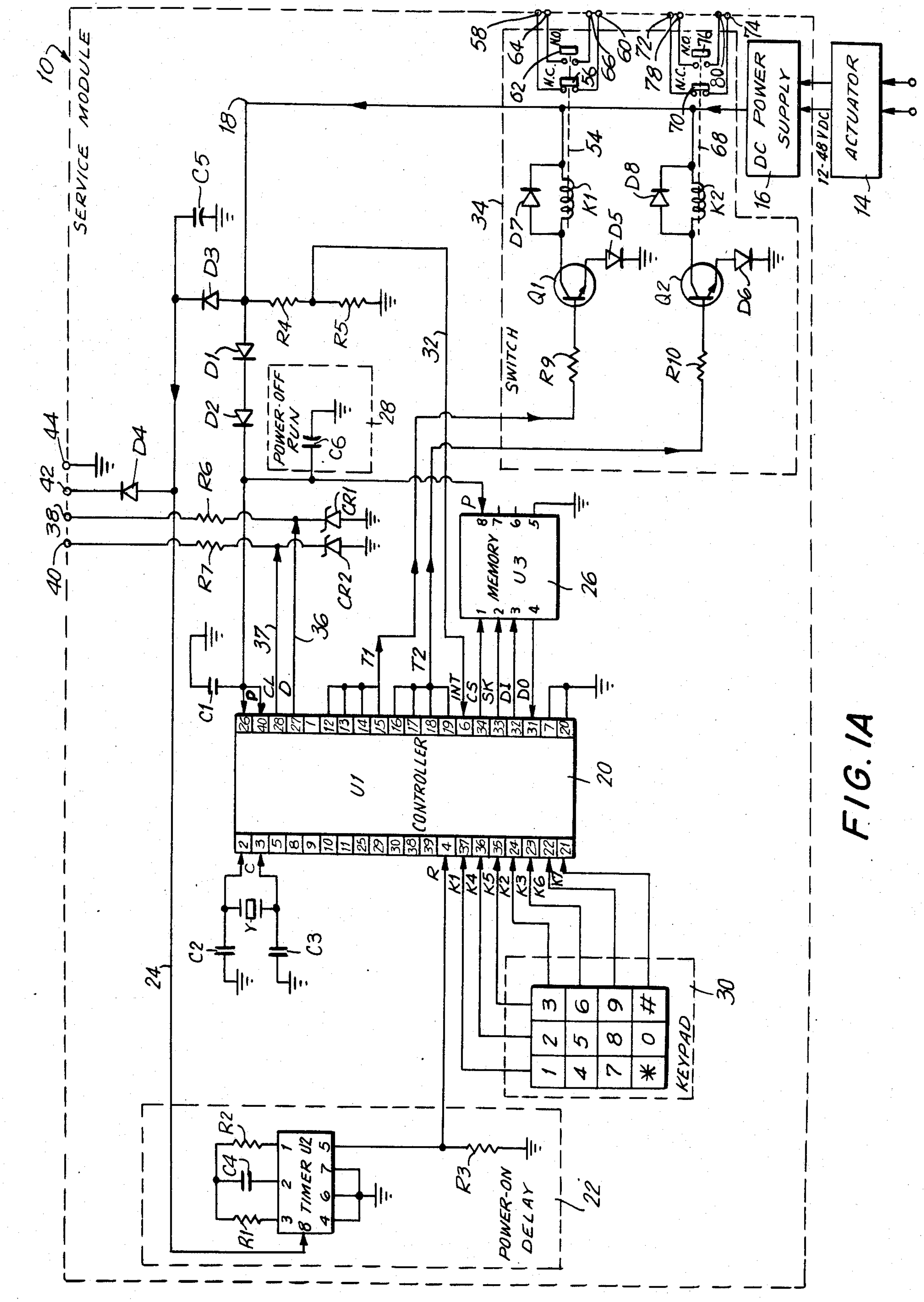
FIG. 1A is an electrical circuit schematic of one portion of the running time maintenance monitor in accordance with this invention.
Figure 1B:
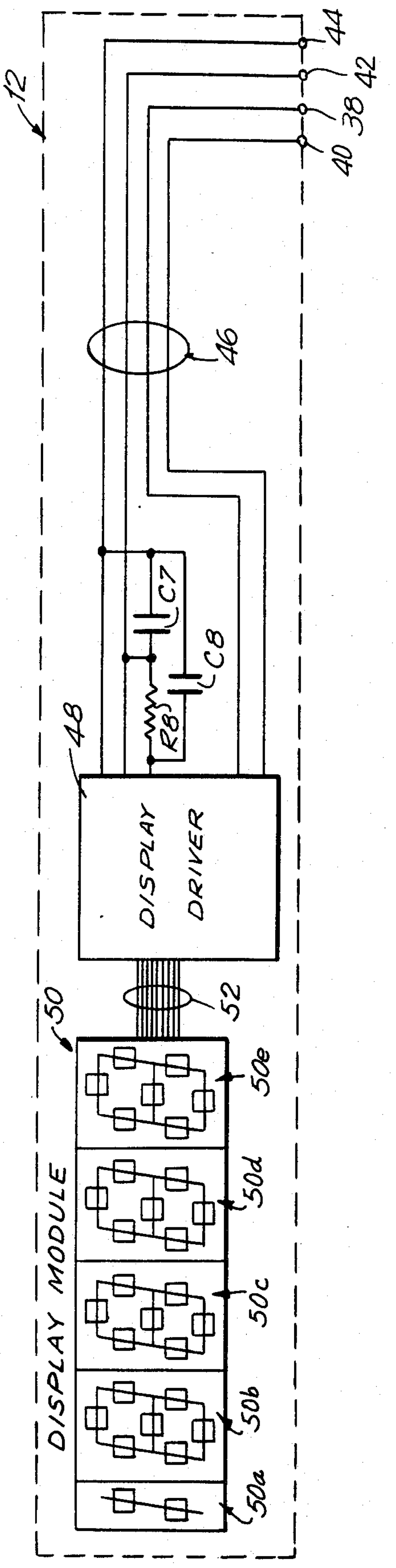
FIG. 1B is an electrical circuit schematic of the remaining portion of the monitor of FIG. 1B.

Referring now to the drawings, reference numeral 10 in FIG. 1A generally identifies a service module, and reference numeral 12 in FIG. 1B generally identifies a display module, both of said modules together constituting a running time maintenance monitor in accordance with this invention for indicating that equipment requiring periodic preventive maintenance, and operatively connected to the monitor, is due for such maintenance. Representative examples of such equipment are fork lift and other industrial trucks, trains, buses, automobiles, taxis, aircraft and aircraft ground support equipment, machinery, construction equipment, farm equipment, etc.

The equipment typically is started and operated by closing an actuator 14 or switch, conventionally an ignition switch, which is turned successively from an initial off position, through an on position, through an off position, and thereupon to a start position for conducting electrical current from a battery to a power drive to energize the equipment. The actuation of the actuator 14, i.e. the closing of the ignition switch, starts the time period in which the equipment is operated. One of the functions of the maintenance monitor of this invention is to detect and accurately measure this running time each time the equipment is operated in order to advise a user, be it the person who actually operates the equipment, or the owner of the equipment, or the service department assigned to maintain the equipment, of the total running time in order to determine when the equipment should next be serviced.

Returning to FIG. 1A, the closed actuator 14 is operative to conduct the battery voltage, typically in the range from 12–48 v DC, to a DC switch mode power supply 16 operative to convert the battery voltage anywhere in the aforementioned range to about 6.5 v DC. The switch mode power supply 16 is insensitive to heat and free of electrical transients. The 6.5 v DC voltage from the power supply 16 is conducted along a power conductor 18 through a pair of series-connected diodes D1, D2 to a pair of power (P) input terminals 26, 40 of a programmed controller 20, which is preferably a microcomputer chip U1 with an internal non-volatile memory sold by INTEL, Inc. under its Model Nos. 8049 or 8050. The power input terminals are tied together, and are connected to ground by capacitor C1. The programmed operation of the controller is described below.

The monitor also comprises a crystal oscillator Y having its outputs connected to ground through capacitors C2 and C3, respectively, and connected to oscillator (C) input terminals 2, 3 of the controller 20. The oscillator provides constant frequency clock signals used for timing the running time of the equipment after actuation.

As described below, the controller 20 is operative to accumulate each running time of the equipment by counting the clock signals. In accordance with another feature of this invention, a re-set generator or a power-on delay subcircuit 22 is operative for delaying the time accumulating function of the control means for a brief interval of time at the beginning of each actuation of the actuator 14. The power-on delay subcircuit 22 includes an integrated circuit timer control chip U2 sold by Artisan Electronics Corp. as its Model No. PP1343. Time constant elements R1, C4, R2 are connected across terminals 1, 2, 3 of chip U2; terminals 4, 6, 7 of chip U2 are connected to ground; power input terminal 8 of chip U2 is connected by a conductor 24 to power conductor 18 via diode D3, and to ground via capacitor C5; and power output terminal 5 of chip U2 is connected through resistor R3 to ground, and to a reset (R) terminal 4 of the controller.

When power to the equipment is first turned on by closing the actuator 14, the timer control chip U2 immediately generates a reset pulse and maintains it for a brief time interval, on the order of 2–3 seconds, at reset terminal R. Thereupon, the reset pulse is no longer generated, and the controller is no longer being commanded to reset itself, thereby permitting the controller to perform its accumulating and other operating functions, as described below. The 2–3 second power-on delay before permitting the controller to become operational guarantees that the equipment has indeed been turned on, which is of particular value when it is recalled that the conventional ignition switch is turned through an off-on-off-on cycle. In addition, the power-on delay serves to guarantee that the components, particularly the solid-state integrated circuit chips, will have an increased working lifetime and will efficiently operate without any loss of data.

Figure 2:
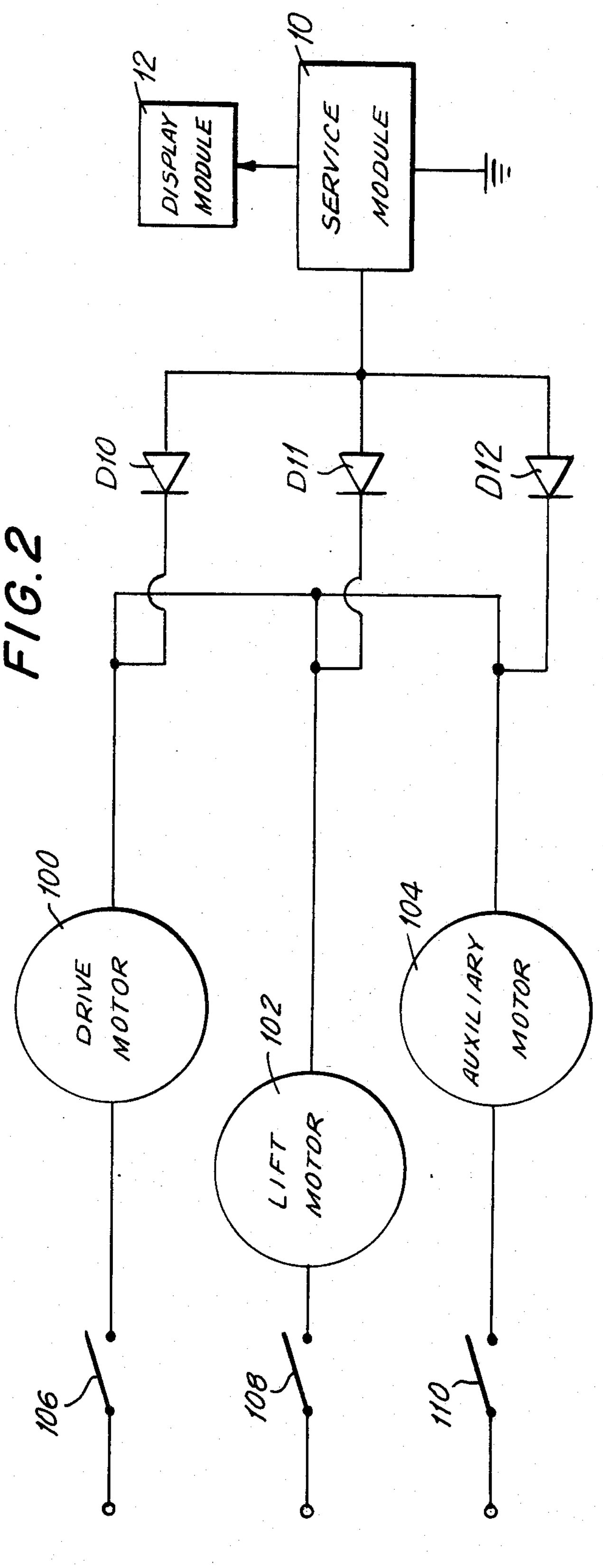
FIG. 2 is an electrical circuit schematic of the maintenance monitor of FIGS. 1A and 1B as operatively connected with a fork lift truck.

As described below, the controller 20 cooperates with an external memory chip 26 which, among other data, stores the accumulated running time. In accordance with another feature of this invention, a power-off run subcircuit 28 is operative for continuing the operation of the time accumulating and other functions of the controller for a brief interval of time in the event of and during power interruption, such as equipment battery failure or fluctuation, or power failure or fluctuation, or during the aforementioned off-on-off-on cycle of the ignition switch. For some equipment, such as electric fork lift trucks, there is more than one operating component which contributes to the total running time and, hence, wear-and-tear of the equipment. Thus, as shown in FIG. 2, an electric fork lift truck may comprise at least three motors: a drive motor 100 for propelling the truck over the ground, a lift motor 102 for lifting a load in a lift carriage, and an auxiliary motor 104 for tilting or projecting the lift carriage and/or for power steering. The drive, lift and auxiliary motors each has its own actuation switch 106, 108, 110, respectively, and each is connected to the service module 10 through its own buffer diode D10, D11, D12, respectively. In the interval of time between deenergizing one motor and energizing another motor, the power-off run subcircuit continues the operation of the controller and memory chips and, hence, keeps track of the total running time. In a preferred embodiment, the power-off run subcircuit 28 constitutes a capacitor C6 having one end connected to power conductor 18 and charged by the voltage thereon to about 6.2 volts, and its opposite end grounded. The charged end of the capacitor C6 is connected to the power input terminals P of the controller 20, and to the power input terminal P of the memory 26. In the event of an interruption of power from the equipment so that 6.5 v DC no longer is conducted to the controller 20 along power conductor 18, then the charged capacitor C6, which remains charged for about 2-3 seconds, discharges and supplies power to the controller and the memory.

Returning to FIG. 1A, the monitor comprises a data entry means, preferably a seven-segment membrane-type keyboard or keypad 30 having ten keys labeled zero through nine, and two more keys labeled with an asterisk (*) and a number (#) sign. The twelve keys are arranged in a three-by-four matrix and have seven outputs identified as keypad terminals K1 through K7 respectively connected to terminals 37, 24, 23, 36, 35, 22, 21, of the controller 20. By depressing the appropriate keys, various data are manually entered. As described in more detail below, such data can include an individualized access code, a warning time indicative of an advance notification of when maintenance is due, a maintenance time indicative of when maintenance is due, an individualized portion of a warning message for display on the display module 12, an initial starting time indicative of when the warning and the maintenance times are to start running, and a service time indicative of when the equipment was last maintained.

In addition, various keys may be depressed to perform certain functions, such as resetting the service time to zero, or retrieving the warning and maintenance times, etc.

The external memory chip U3 is an EEPROM chip sold by National Semiconductor Corp. as its Part No. NMC 9306N. Terminals 1, 2, 3, 4 of chip U3 are respectively connected to chip select (CS) terminal 34, clock (SK) terminal 33, data in (DI) terminal 32 and data out (DO) terminal 31 of the controller 20. Terminal 8 of chip U3 is the power input terminal P, and terminal 5 of chip U3 is grounded. The external memory chip U3 and the aforementioned internal non-volatile memory of the microcomputer 20 together constitute a data storage means, or, hereinafter, the memory, for storing the manually and also the non-manually entered data, such as alphabetic characters of a warning and/or a maintenance message, such alphabetic characters being the same for all users.

The controller 20 is programmed to perform several functions. Whenever the actuator 14 is actuated, the aforementioned 6.5 v DC signal is conducted along power conductor 18 to the power input terminals P of the controller. At the same time, a DC voltage of reduced magnitude is picked up at a voltage divider composed of resistors R4, R5 and is conducted along a conductor 32 to an interrupt (INT) terminal 6 of the controller to smooth any power fluctuations. With the assistance of the oscillator Y which generates timing signals, the controller detects the actuation of the actuator 14 and measures, by counting the timing signals, the running time that the actuator 14 remains actuated. The controller includes an accumulator for accumulating each running time whenever the actuator is actuated. In a preferred embodiment, the accumulator accumulates the running time in six-second increments from an initial starting time, which can be as low as 6 seconds, to a maximum of 19,999 hours. The thus-accumulated running time is stored in the memory, which retains its stored data even when power is removed and, hence, requires no battery back-up.

When the accumulated running time matches the warning time previously manually entered by the user via keypad 30 and stored in the memory, then the controller 20 is operative to generate a warning signal at output data (D) terminal 27 of the controller, and at the same time to generate a first control (T1) signal at tied-together control output terminals 12, 13, 14, 15 of the controller. When the accumulated running time matches the maintenance time previously manually entered by the user via keypad 30 and stored in the memory, then the controller 20 is operative to generate a maintenance signal at output data (D) terminal 27, and a second control (T2) signal at tied-together control output terminals 16, 17, 18, 19 of the controller. As described below, the warning and maintenance signals are conducted to the display module 12 to display warning and maintenance messages, whereas the first and second control signals T1, T2 are conducted to switching subcircuit 34 for opening and/or closing switches to initiate the performance of some desired function(s).

As mentioned previously, an individualized access code is selected by the user, and manually entered via the keypad 30, and stored in the memory. Knowledge of this access code is required to initiate changing of some of the other entered data, e.g. when it is desired to change the warning time, the maintenance time, the service time, or the individualized message, or when it is desired to perform some function, such as resetting a time, or retrieving entered data. The controller includes a verifier operative for verifying that a subsequently entered code matches the stored access code, and an enabler operative for enabling any one or more of the aforementioned stored data to be changed, or for enabling any one or more of the aforementioned functions to be performed.

As noted previously, the warning signal, the maintenance signal, and all the other signals to be displayed on the display module 12 are conducted along data (D) conductor 36 whose output end is connected via clamping diode CR1 to ground, and is connected to data terminal 38 via resistor R6. A series of clock signals is outputted from terminal 28 of the controller 20 along clock (CL) conductor 37 whose output is connected via clamping diode CR2 to ground, and is connected to clock terminal 40 via resistor R7. A diode D4 connects conductor 24 to a power terminal 42. A ground terminal 44 is grounded. The four terminals 40, 38, 42, 44 are connected by a four-wire cable 46 (see FIG. 2) to a display driver 48 which, in turn, is connected by a multi-wire cable 52 to a multi-element display 50. The display driver 48 and display 50 are sold as a unit by Artisan Electronics Corp. as its Model No. SR8000. The display driver 48 is an integrated circuit known individually by Artisan as its Model No. MM5453, and the display is a 4½ digit, 7 segment, LCD display known individually by Artisan as its Model No. PP1381. A power smoothing and filtering network consisting of resistor R8 and capacitors C7, C8 is connected between the display driver and the power and ground wires.

Display element 50*a* has two line segments arranged to resemble the numeral "1", and each of display elements 50*b*, 50*c*, 50*d*, 50*e* has seven line segments arranged to resemble a flattened numeral "8". The line segments are separately energizable by the controller to light up and form a desired alphabetic, numeric, or alpha-numeric display.

When the monitor is first installed by the user on the equipment, it has a blank access code, as well as a blank for the starting running time. In the preferred embodiment, the access code and the starting running time are selected and set only once by the user. The controller is programmed to accept and store the access code and starting running time in the following manner: While the equipment and monitor are actuated, the user first depresses the # key, then depresses four keys representing the selected access code, then depresses five keys representing the starting running time in hours, and finally depresses the * key. The access code and starting running time are now stored in the memory, and the user cannot obtain or change this data. Once the * key is depressed, the controller will cause the access code to be displayed for about 30 seconds to permit the user to accurately record it. If a starting running time of less than five digits is desired, then the leading zeros must be entered. If more than nine digits are entered before the * key is depressed, then only the last nine will represent the access code and starting running time.

In the event that one forgets the access code, or wishes to initialize the starting running time, then the monitor is reset by entry of a secret master code known only to the manufacturer which, when entered, wipes out the old access code, resets the starting running time to zero, and enables the controller to accept and store a new access code and new starting running time in the manner described above.

The monitor now can be programmed by the user to accept and store the warning time, the maintenance time, and at least a numerical portion of a warning message, and is accomplished in the following manner: The user first depresses the # key, then depresses four keys representing the access code, then depresses three keys representing the warning time in service units (1 service unit equals 2 hours), then depresses three more keys representing the maintenance time in service units, then depresses seven more keys representing the phone number of the service department which is to be called to service the equipment, and finally depresses the * key. If a time less than three digits is desired, then leading zeros must be entered. Should an error be made in entering the correct thirteen digits following the access code, then the user depresses the # key, reenters the access code, and follows this with a new string of thirteen digits. The warning and maintenance times are now stored in the memory, and the user can change either or both of these times, as well as the phone number, but only if the user has knowledge of the access code. The aforementioned verifier of the controller verifies that the subsequently entered code matches the stored access code and, in this way, tampering with any of these times or phone number is resisted.

Once the * key has been depressed, the controller will cause the display to display the following for fifteen seconds each:

(a) a three digit numerical display indicating the warning time in hours;

(b) a three digit numerical display indicating the maintenance time in hours;

(c) a four digit alphabetical display indicating the word "CALL";

(d) a four digit alpha-numerical display indicating the first three digits of the aforementioned phone number and a hyphen; and (e) a four digit numerical display indicating the last four digits of the aforementioned phone number.

Once the monitor has been programmed with the warning time, the maintenance time, and the service department phone number, the controller will generate the aforementioned warning and maintenance signals at output data terminal 27 when the accumulated running time matches the warning and maintenance times, and cause the warning and maintenance messages to be respectively displayed. The warning message consists of the following display sequence: the letters "CALL", the first three digits of the phone number and a hyphen, and the remaining four digits of the phone number. Thus, a warning message individualized to each user is provided to effect better compliance with the maintenance program. As previously noted, the letters "CALL" were previously permanently stored in the memory, and were not entered by the user. The maintenance message consists of the single alphabetical display consisting of the letters "OFF". The letters "OFF" were previously permanently stored in the memory, and were not entered by the user. It is desirable for better visual impact for the "OFF" maintenance message to flash on and off.

At times other than the warning and maintenance times, the controller 20 is operative to cause the display 50 to normally display the accumulated running time in hours and is updated in 6-second increments from a starting running time to a maximum of 19,999 hours. As another feature, the controller further comprises means for enabling the display 50 to display the time since the last service in hours and tenths of hours and is updated in 6-second increments from a starting running time to a maximum of 510 hours. Unlike the accumulated running time, the time since the last service can be reset to zero by the user, and is accomplished in the following manner: The user first depresses the # key, then depresses four keys representing the access code, then depresses the "0" key, and finally depresses the * key. The time since last service has now been reset to zero; this information is stored in memory 26; and, of course, one cannot change or tamper with the time since last service or the resetting thereof unless the user has knowledge of the access code. When power first is applied to the monitor, prior to the expiration of the warning or maintenance times, the display first will display the time since last service for about ten seconds, after which the display will normally display the accumulated running time.

Once entered, a user may retrieve the warning time, the maintenance time, and the telephone number in the following manner: The user first depresses the # key, then depresses the four keys representing the access code, and finally depresses the * key. The controller enables the display to sequentially display the warning time, the maintenance time, and the phone number.

As mentioned previously, the controller will generate first (T1) and second (T2) control signals for conduction to switching subcircuit 34 at the warning and maintenance times, respectively. The T1 control signal is approximately 2.4 v at 400 microamperes, and is conducted through resistor R9 to switching transistor Q1 whose emitter is grounded via diode D5, and whose collector is connected to energizable relay coil K1 which has a diode D7 connected in parallel thereacross. Similarly, the T2 control signal is approximately 2.4 v at 400 microamperes, and is conducted through resistor R10 to switching transistor Q2 whose emitter is grounded via diode D6, and whose collector is connected to energizable relay coil K2 which has a diode D8 connected in parallel thereacross. Relay K1 is operatively connected along line of action 54 to a normally-closed switch 56 having output terminals 58, 60, and also to a normally-open switch 62 having output terminals 64, 66. Similarly, relay K2 is operatively connected along line of action 68 to a normally-closed switch 70 having output terminals 72, 74, and also to a normally-open switch 76 having output terminals 78, 80.

Each transistor Q1, Q2 is normally off. At the warning and maintenance times, the respectively generated control signal T1, T2 biases its associated transistor to an on state, thereby energizing the associated relay and changing the state of the switches 56, 62, 70, 76. The switches 56, 62, 70, 76 can be connected to any external control device for performing a desired function. For example, in some applications, it may be desirable to disable the equipment at the maintenance time and, hence, a disabling control device can be connected to one or more of said switches to cause the equipment to cease operating until it is serviced.

In a preferred embodiment, the service module components are housed in a high-impact-resistant plastic housing whose interior surface is coated with a conductive layer to provide radio frequency shielding. The display module is similarly mounted in a high-impact-resistant plastic housing. The service module components are encapsulated in an epoxy resin to provide resistance to shock. The four-wire cable 46 between the service and display modules permits a remote mounting for the display module, and makes the monitor easy to install. The cable 46 is easily routed along a path on the equipment, preferably along a path which is remote from any moving parts which may tend to crimp or rupture the cable.

The components identified in the drawings have the following values in the preferred cases:

| | |
|---|---|
| R1 | 68k ohms, ¼w |
| R2 | 33k ohms, ¼w |
| R3 | 4.7k ohms, ¼w |
| R4 | 1.6k ohms, ¼w |
| R5 | 1.0k ohms, ¼w |
| R6 | 5.6k ohms, ¼w |
| R7 | 5.6k ohms, ¼w |
| R8 | 1.0 M ohms, ¼w |
| R9 | 2k ohms, ¼w |
| R10 | 2k ohms, ¼w |
| C1 | .03 μf |
| C2 | 20 pf |
| C3 | 20 pf |
| C4 | 6.8 μf |
| C5 | 100 μf |
| C6 | .1 F |
| C7 | 4.7 μf |
| C8 | 470 pf |
| D1 through D8, D10, D11, D12 | Artisan diode Model No. PP1217. |

-continued

| | |
|---|---|
| CR1, CR2 | Artisan clamping diode Model No. PP1144 at 6.2 v. |
| Q1, Q2 | Artisan transistor Model No. MPS-D04. |
| Y | crystal oscillator 2.45 MHz. |

It will be understood that each of the elements described above, or two or more together, may also find a useful application in other types of arrangements differing from the type described above.

While the invention has been illustrated and described as embodied in a tamper-resistant, running time maintenance monitor with individualized maintenance message and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A tamper-resistant, running time maintenance monitor for indicating that equipment operatively connected to the monitor is due for maintenance, said monitor comprising:

(a) data entry means for manually entering an individualized access code, and for manually entering a maintenance time for the equipment to be maintained;

(b) data storage means for storing the individualized access code and the maintenance time;

(c) running time sensor means for detecting the running time of the equipment each time the latter is operated;

(d) control means operatively connected to the data entry means and the data storage means, and including verification means for verifying that a subsequently entered code matches the stored code, and enabling means for enabling the stored maintenance time to be changed when the subsequently entered code matches the stored code to resist tampering with the stored maintenance time, and said control means also being operatively connected to the running time sensor means, and also including accumulator means for accumulating each detected running time, and means for generating a maintenance signal when the accumulated running time matches the stored maintenance time; and (e) display means operatively connected to the control means, and operative for displaying a maintenance message upon generation of the maintenance signal.

2. The maintenance monitor as recited in claim 1, wherein the display means includes a multi-element display, each element having line segments selectively energizable by the control means, and wherein the control means is operative to selectively energize the line segments of the display elements to form the maintenance message of alphabetic characters upon generation of the maintenance signal.

3. The maintenance monitor as recited in claim 1, wherein the data entry means also includes means for manually entering an individualized maintenance message, and wherein the data storage means includes means for storing the individualized maintenance message, and wherein the display means displays the stored message.

4. The maintenance monitor as recited in claim 3, wherein the control means includes means for changing the stored message when the subsequently entered code matches the stored access code to resist tampering with the stored message.

5. The maintenance monitor as recited in claim 3, wherein the display means includes a multi-element display, each element having line segments selectively energizable by the control means, and wherein the control means is operative to selectively energize the line segments of the display elements to form the individualized maintenance message of alpha-numeric characters upon generation of the maintenance signal.

6. The maintenance monitor as recited in claim 1, wherein the data entry means also includes means for manually entering a warning time indicative of an advance indication of when the equipment is due for maintenance, and wherein the data storage means includes means for storing the warning time, and wherein the control means includes means for changing the stored warning time when the subsequently entered code matches the stored access code to resist tampering with the stored warning time.

7. The maintenance monitor as recited in claim 6, wherein the control means also includes means for generating a warning signal when the accumulated running time matches the stored warning time, and wherein the display means is operative for displaying a warning message upon generation of the warning signal, and wherein the display means includes a multi-element display, each element having line segments selectively energizable by the control means, and wherein the control means is operative to selectively energize the line segments of the display elements to form the warning message of alpha-numeric characters upon generation of the warning signal, and to form the maintenance message of alphabetic message upon generation of the maintenance signal.

8. The maintenance monitor as recited in claim 7, wherein the alpha-numeric warning message consists, at least in part, of the seven numerical digits of the telephone number of a service department for maintaining the equipment.

9. The maintenance monitor as recited in claim 7, wherein said control means also generates a first control signal and a second control signal when the warning signal and the maintenance signal are respectively generated; and further comprising switching means for opening and closing an electrical circuit upon generation of the first and the second control signals.

10. The maintenance monitor as recited in claim 6, wherein the data entry means also includes means for manually entering an initial starting time from which the warning time and the maintenance time both start running, and wherein the data storage means includes means for storing the initial starting time.

11. The maintenance monitor as recited in claim 10, wherein the data storage means is operative for permanently storing a secret master code, and wherein the control means includes means for removing the stored access code and the stored initial starting time upon manual entry of the secret master code to the data entry means.

12. The maintenance monitor as recited in claim 6, wherein the control means includes means for retrieving the warning time and the maintenance time when the subsequently entered code matches the stored access code to resist tampering with the warning time and the maintenance time.

13. The maintenance monitor as recited in claim 1, wherein the data storage means also includes means for storing a service time indicative of when the equipment was last maintained, and wherein the control means includes means for comparing the accumulated running time with the service time to generate a time-since-last-service time signal, and wherein the display means separately displays a time-since-last-service numerical display upon generation of the time-since-last-service time signal.

14. The maintenance monitor as recited in claim 13, wherein the display means separately displays the accumulated running time.

15. The maintenance monitor as recited in claim 13, wherein the control means includes means for resetting the service time to zero when the subsequently entered code matches the stored access code to resist tampering with the stored service time.

16. The maintenance monitor as recited in claim 1; and further comprising power-on delay means operatively connected with the control means, for delaying operation of the accumulator means for a predetermined time interval after power actuation of the equipment being maintained.

17. The maintenance monitor as recited in claim 1; and further comprising power-off run means operatively connected with the control means, for continuing operation of the accumulator means for a predetermined time interval after power interruption of the equipment being maintained.

18. The maintenance monitor as recited in claim 1, wherein said control means also generates a control signal when the maintenance signal is generated; and further comprising switching means for opening and closing an electrical circuit upon generation of the control signal.

19. A tamper-resistant, running time maintenance monitor for indicating that equipment operatively connected to the monitor is due for maintenance, said monitor comprising:

(a) data entry means for separately manually entering an individualized access code, a warning time, a maintenance time, and at least an individualized numerical portion of a warning message;

(b) data storage means for separately storing the individualized access code, the warning time, the maintenance time, and the individualized numerical portion of the maintenance message;

(c) running time sensor means for detecting the running time of the equipment to be maintained each time the equipment is operated;

(d) control means operatively connected to the data entry means and the data storage means, and including verification means for verifying that a subsequently entered code matches the stored access code, and enabling means for separately enabling the stored warning time and the stored maintenance time to be respectively changed when the subsequently entered code matches the stored access code to resist tampering with the stored warning time and the stored maintenance time, said control means also being operatively connected to the running time sensor means, and also including accumulator means for accumulating each detected running time, and means for generating a warning signal and a maintenance signal when the accumulated running time respectively matches the stored warning time and the stored maintenance time, said control means being further operative to generate first and second control signals when the warning and maintenance signals are respectively generated;

(e) display means including a multi-element display operatively connected to the control means, each element having line segments selectively energizable by the control means, said control means being operative to selectively energize the line segments of the display elements to form an alpha-numeric warning message consisting, at least in part, of the individualized numerical portion of the warning message upon generation of the warning signal, and to form an alphabetical maintenance message upon generation of the maintenance signal, said display means also being separately operative to display the numerical accumulated running time; and (f) switching means for opening and closing an electrical circuit operatively connected to the equipment upon generation of the first and second control signals.

20. A tamper-resistant method of indicating that equipment is due for maintenance, comprising the steps of:

(a) manually entering an individualized access code;

(b) storing the individualized access code;

(c) manually entering a maintenance time for the equipment to be maintained;

(d) storing the maintenance time;

(e) detecting the running time of the equipment each time the latter is operated;

(f) subsequently manually entering an access code, and verifying that the subsequently entered code matches the stored individualized access code;

(g) enabling the stored maintenance time to be changed when the subsequently entered code matches the stored individualized access code to resist tampering with the stored maintenance time;

(h) accumulating each detected running time, and generating a maintenance signal when the accumulated running time matches the stored maintenance time; and (i) displaying a maintenance message upon generation of the maintenance signal.

21. The tamper-resistant method as recited in claim 20; and further comprising the steps of manually entering a warning time indicative of an advance indication of when the equipment is due for maintenance, storing the warning time, generating a warning signal when the accumulated running time matches the stored warning time, and displaying a warning message upon generation of the warning signal.

22. The tamper-resistant method as recited in claim 21; and further comprising the steps of manually entering and storing an individualized numerical portion of a warning message, and wherein the displaying step is performed by displaying at least the stored individualized numerical portion of the warning message upon generation of the warning signal, and by displaying the maintenance message with alphabetic characters upon generation of the maintenance signal.

23. The tamper-resistant method as recited in claim 20; and further comprising means for delaying operation of the accumulator means for a predetermined time interval after power actuation of the equipment being maintained.

24. The tamper-resistant method as recited in claim 20; and further comprising means for continuing operation of the accumulator means for a predetermined time interval after power interruption of the equipment being maintained.

25. A running time monitor for indicating the total elapsed time that equipment operatively connected to the monitor has been operated, said monitor comprising:

(a) user-settable means for manually setting a starting running time;

(b) data storage means for storing the set starting running time;

(c) running time sensor means for detecting the running time of the equipment each time the latter is operated;

(d) control means operatively connected to the data storage means and running time sensor means, and including accumulator means for accumulating each detected running time, and means for generating a total elapsed time signal indicative of the total elapsed time since the set starting running time;

(e) display means operatively connected to the control means, and operative for displaying the total elapsed time upon generation of the total elapsed time signal; and (f) factory reset means for resetting the starting running time set by the user to a desired initial value.

* * * * *